Jan. 26, 1971 R. S. WISE 3,559,084

ELECTRICAL SIGNAL ATTENUATION NETWORK

Filed Dec. 29, 1967

INVENTOR.
RICHARD S. WISE

BY

Campbell, Harris & O'Rourke

ATTORNEYS

United States Patent Office 3,559,084
Patented Jan. 26, 1971

3,559,084

ELECTRICAL SIGNAL ATTENUATION NETWORK

Richard S. Wise, Boulder, Colo., assignor to Ball Brothers Research Corporation, Boulder, Colo., a corporation of Colorado

Filed Dec. 29, 1967, Ser. No. 694,547
Int. Cl. H03f *3/18*
U.S. Cl. 330—13 17 Claims

ABSTRACT OF THE DISCLOSURE

A video signal attenuator having complementary transistor pairs to attenuate a video signal by a factor determined by an applied control voltage. Each transistor pair receives the input video signal and effects across an output resistive matrix video signals as attenuated without distortion but of substantially equal amplitude and polarity, and direct current signals of substantially equal amplitude and opposite polarity so that low frequency transient signals occasioned by variations of the control voltage do not appear at the output with the attenuated video signals.

BACKGROUND OF THE INVENTION

Field of the invention

This invention relates to signal attenuators and more particularly to wideband video signal attenuators having electrical attenuation control.

Description of the prior art

It is often necessary to control the output level of a signal, and particularly the output level of a video signal from a remote location. Further, it also is often desirable to attenuate a video signal in order to control the level of the video signal, and to control the level automatically and in accordance with the magnitude of a control signal without distortion or phase shift of the video signal during attenuation in the apparatus. Such apparatus is desirable for use in television equipment, for example, where video signals from two associated cameras are utilized in conjunction with one another and most often at different levels including the situation where one signal is reduced to zero as the other is increased to full magnitude in order to portray a different scene. Devices heretofore known and/or utilized, however, have not been entirely successful in accomplishing this end.

Also in television practice where a single video signal is to be processed, the signal must be maintained between predetermined signal levels. Therefore, a detector has heretofore been provided responsive above and below a video signal threshold to effect a signal to an automatic gain control which in turn provides a corresponding signal to a video attenuator to decrease or increase, respectively, the amplitude of the video signal.

Heretofore, the prior art has utilized various types of attenuators, including amplifiers wherein the gain of the amplifier is varied to effect attenuation. Such devices have not been satisfactory since the characteristics of the amplifiers vary over the wide range of video signal frequencies.

The prior art has utilized various current flow control devices as attenuators, in particular, transistor pairs of one conductivity type connected in grounded base configuration at video signal frequencies, which configuration is known in the art to offer most reliable and predictable transistor characteristics which do not unduly vary with temperature. Variation of attenuation of the video signal by control of the attenuation factor from a remote voltage source connected to the base of one of the transistors of the pair, however, introduced low frequency transients in the output circuit due to changes in direct current at the output as the impedance of the current paths through the transistors vary with respect to one another. In order to reproduce only the video signal as attenuated, and without low frequency transients, a clamp at the amplifier output was necessary or a special circuit provided so that bias current in the attenuator would remain always constant even though the input signal varied. The main disadvantage of the former is that the clamps consume power, have varying characteristics with temperature changes, and do not faithfully reproduce and restore the direct current component of the video signal. The disadvantage of prior art circuits utilized to maintain attenuator bias currents constant is mainly that such circuits tend to introduce distortion in the attenuated video signal. Further, the bias currents must usually be maintained equal in all coupling circuits. Such accurate regulation is difficult to obtain without changes in component characteristics due to aging and/or temperature as occasioned by long operation of the circuit.

The present invention solves the aforenoted problems of the prior art in providing a wideband video attenuator having a fast response time and which attenuator is easily controlled from a remote location by a small direct current control voltage. The attenuator is effective to reproduce the video signal as attenuated, without distortion and low frequency transients, and without the aforenoted change in the direct current output level.

SUMMARY

The present invention provides an electrical signal attenuator responsive to a control voltage which may be varied to change the attenuation of the signal substantially without distortion of the signal and without a change in the direct current output signal level.

It is accordingly an object of the present invention to provide an improved attenuator wherein a separate control signal is utilized for attenuation without introducing distortion or low frequency transients into the output attenuated signal.

Another object of the present invention is to provide a video signal attenuator having complementary transistor pairs with the amount of attenuation being controlled by a direct current signal.

A further object of the invention is to provide a wideband video attenuator having parallel complementary transistor pairs, each pair of which tends to cancel distortion generated by the other pair.

Still another object of the invention is to provide a video signal attenuator having transistor pairs with the outputs of each transistor pair attenuated in accordance with a direct current control signal, being of substantially equal amplitude and polarity while direct current signal changes at each output are of substantially equal amplitude and opposite polarity, the attenuator signal being then combined in a resistive matrix connected to said transistor outputs.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiments of the hereindisclosed invention are meant to be included as come within the scope of the claims.

DESCRIPTION

Figure 1:
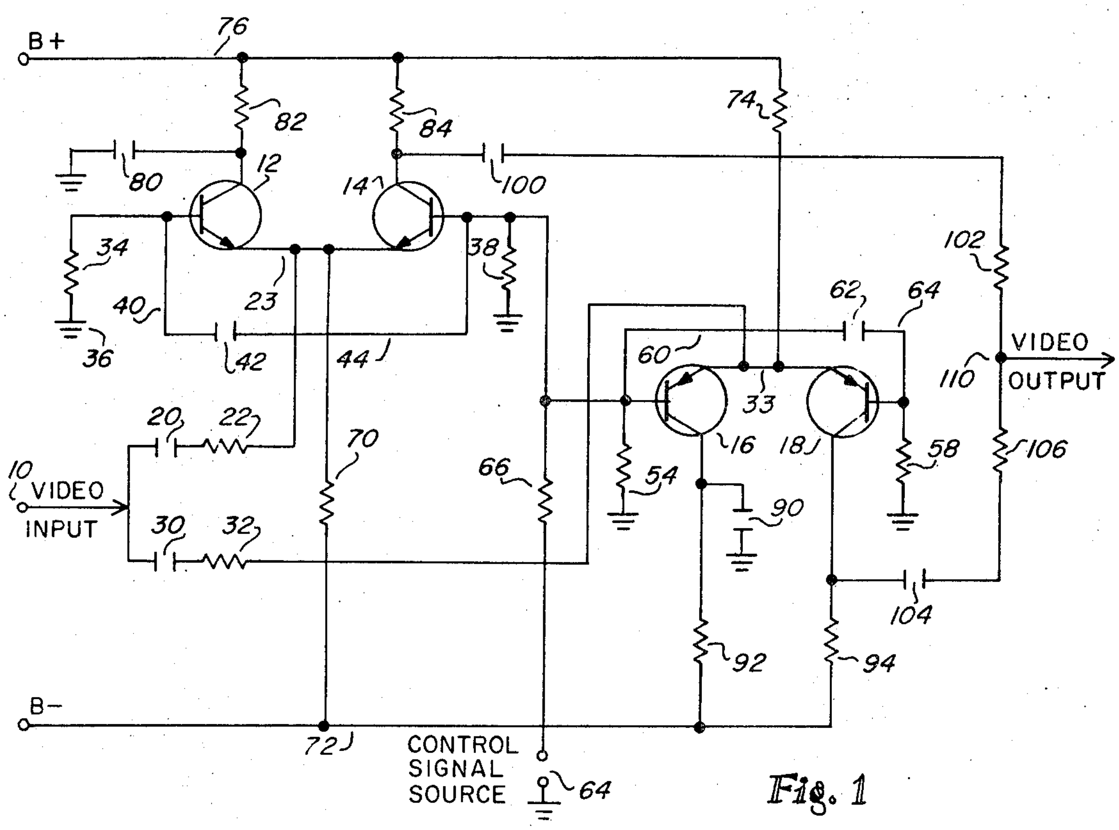
FIG. 1 is a circuit diagram of the attenuator of the present invention.

Referring to FIG. 1, the video signal attenuator of the invention includes a video signal input 10 for receiving an input signal that is coupled to two parallel complementary transistor pairs of opposite conductivity, the first pair of which comprises NPN-type transistors 12 and 14 connected in grounded base configuration and the other pair of which comprises PNP-type transistors 16 and 18 also connected in grounded base configuration. The NPN-type transistors 12 and 14 and the PNP-type transistors 16 and 18 are of high beta type so that the current flowing through the emitters thereof substantially flows also through the respective collectors thereof.

The video signal is conducted to the transistors 12 and 14 through a serially connected capacitor 20 and resistor 22 leading to a conductor 23 which directly connects the emitters of the transistors 12 and 14. Similarly, the video signal is conducted to the transistors 16 and 18 through a capacitor 30 and a resistor 32 serially connected to a conductor 33 directly connecting the emitters of transistors 16 and 18. The resistance of the resistors 22 and 32 is very high compared with the impedance of the emitters of the transistors 12 and 14, and 16 and 18, respectively, so that the video signal may be considered as originating from a current source.

The base of the transistor 12 is connected through a resistor 34 to ground 36 while the base of transistor 14 is connected through a resistor 38 to ground 36. The resistors 34 and 38 have a low resistance value so that the bases of the transistors 12 and 14 are practically at ground potential. The base of the transistor 12 is also connected by a conductor 40 to one side of a capacitor 42, the other side of which is connected by a conductor 44 to the base of the transistor 14 and to the ungrounded end of resistor 38. The capacitor 42 is provided to block direct current flow between bases of transistors 12 and 14 and to maintain these bases at substantially the same alternating current potential.

Referring to the PNP-type transistor pair, the connections are similar to the aforenoted respective elements of the NPN transistor pair. In particular, the base of the transistor 16 is connected through a resistor 54 to ground 36, while the base of the transistor 18 is connected through a resistor 58 leading also to ground 36. The resistors 54 and 58 have a low resistance value so that the bases of the transistors 16 and 18 are practically at ground potential. The base of the transistor 16 is further connected through a conductor 60 leading to one side of a capacitor 62, the other side of which is connected through a conductor 64 to the base 18 and to the ungrounded end of the resistor 58. The capacitor 62 is provided to block direct current flow between the bases of transistors 16 and 18 and to maintain these bases at substantially the same alternating current potential.

A direct current control voltage input 64 is connected to one end of a resistor 66, the other end of which is connected to the base of NPN transistor 14 and to the base of PNP transistor 16.

The common conductor 23 connecting the emitters of the NPN-type transistors 12 and 14 is connected to a resistor 70 leading to a conductor 72 connected to B− source of supply voltage (not shown). The common conductor 33 connecting the emitters of the PNP-type transistors 16 and 18 is connected to a resistor 74 leading to a conductor 76 connected to a B+ source of supply voltage (not shown). Direct current through the transistors 12, 14 and 16, 18 is determined substantially by the resistors 70 and 74 which have a resistance value much higher than the impedance of the respective emitters of transistors 12, 14 and 16, 18.

The collector of the transistor 12 is connected to one side of a capacitor 80 which provides an alternating current bypass for video signals appearing on the collector of the transistor 12, the opposite side of which capacitor is connected to ground 36. The collector of the transistor 12 is also connected to one end of a resistor 82 common to the connection of the one plate of the capacitor 80 and which resistor 82 leads to the B+ source of supply voltage by conductor 76. The collector of the transistor 14 is connected through a resistor 84 also leading to the B+ source of supply voltage by conductor 76.

The collector of the transistor 16 is connected to one side of a capacitor 90 which provides an alternating current bypass for video signals appearing on the collector of transistor 16, the opposite side of which capacitor leads to ground 36. The collector of the transistor 16 is also connected to one end of a resistor 92 common to the connection of the one side of capacitor 90 and which resistor 92 leads to the B− source of supply voltage by conductor 72. The collector of the transistor 18 is connected through a resistor 94 also leading to the B− source of supply voltage by conductor 72.

An impedance matrix is connected to sum an output from one transistor of each of the complementary transistor pairs of the attenuator. In particular, intermediate the connection of the collector of the transistor 14 to the resistor 84, a conductor leads to one side of a capacitor 100, the opposite side of which is connected to one end of the resistor 102 of a resistive matrix. A conductor also leads from the collector of the transistor 18 intermediate the connection of the collector of transistor 18 and the resistor 94 to one side of a capacitor 104, the opposite side of which is serially connected to a resistor 106 of the resistive matrix. The opposite end of resistor 106 is connected to the opposite end of the resistor 102 at the junction 110 from which the attenuator output video signals may be taken which signals are substantially the sum of the signals on the collectors of transistors 14 and 18, respectively.

OPERATION

A video input signal from a camera or other conventional source coupled into the circuit at the input 10 is conducted substantially as a current signal uninverted to the emitters and associated collectors of the transistors 12 and 14. However, the collector of transistor 12 is bypassed to ground as to alternating current video signals by the capacitor 80. If no control signal is applied from the direct current control signal source 64, then the bases of the transistors 12 and 14 are at substantially the same potential and a video signal applied at the input 10 will divide equally between the transistors 12 and 14 and will be conducted to the collectors thereof. However, if a small positive direct current signal is applied to the base of transistor 14, the transistor 14 becomes more conductive, thereby increasing the collector current thereof while the current through transistor 12 to the collector thereof decreases.

In any case, the total current flowing through the transistors 12 and 14 is substantially the same for any direct current control signals applied from the control signal source 64. Thus, the application of a positive direct current control signal voltage causes a shift of the current from the transistor 12 to the transistor 14 such that the ratio of the current sharing, including direct current, of the transistors 12 and 14 may be varied. Inasmuch as this ratio may be varied, the alternating current signal component or video signal at the collector of transistor 14 may be varied in amplitude to effect the desired attenuation of the video input signal.

Similarly, and with reference to the PNP type transistor pair, when no signal is applied from the direct current signal control source 64, the bases of the transistors 16 and 18 are at substantially ground potential as aforenoted. Therefore, the alternating current or video signal and the direct current are conducted and divide equally through the transistors 16 and 18 to the collectors thereof. In particular, the video signal current path includes input 10, conductor 33 and transistors 16 and 18. Upon a small positive direct current control voltage being applied from the control source 64, the potential at the base of the transistor 16 increases rendering the transistor 16 less conductive, thereby rendering transistor 18 more conductive than the transistor 16.

Thus, the current sharing ratio of the transistor 14 to the transistor 12, and of the transistor 18 to the transistor 16, may be controlled by the application of small direct current control signals from the source 64. The video signal current through the collector of the transistors 14 and 18 causes voltage drops across resistors 102 and 106 of the resistive matrix, which video signal voltages are of substantially equal amplitude and polarity. There is substantially no signal loss as the alternating current or video signals add in magnitude and polarity across the resistive matrix.

As brought out hereinabove, the application of a small control voltage is accompanied by a change in the direct current sharing ratio which, is in most cases, undesirable, particularly when the direct current control signal may be subjected to quick and rapid changes, as when an AGC control source is utilized. This change in control voltage would normally cause a direct current signal level change and undesirable low frequency transients at the attenuator output 110. However, this disadvantage is also overcome by the present invention in providing the complementary transistor pairs. As the direct current control signal from the source 64 is varied, the change in the direct current level from the collectors of the transistors 14 and 18 are of equal amplitude but of opposite polarity so that the direct current voltage change across the resistor 102 is cancelled by the direct current voltage change across resistor 106 and the net direct current voltage change at the attenuator output 110 is zero and the direct current level remains substantially the same.

Figure 2:
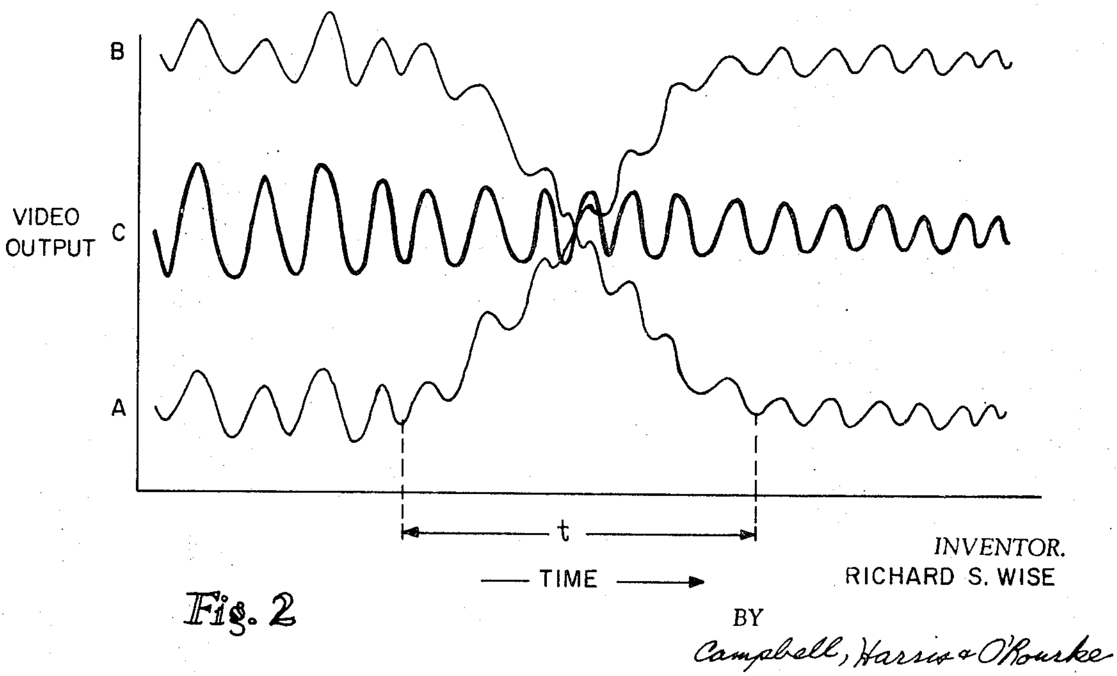
FIG. 2 is a waveform diagram of outputs of each transistor pair in the attenuator and the output of the attenuator over a time interval from before to after the application of an attenuation control signal.

Referring to FIG. 2, the attenuator output is plotted as a function of time wherein the curve A represents the signal generated at the collector of transistor 14, the curve B represents the signal generated at the collector of transistor 18 and the curve C represents the signal at the output terminal 110. The alternating current signals from each collector, upon a signal being applied at input 10, are of same amplitude, phase and polarity and are summed at the output 110 while the direct current signal is the average of the two direct current output signals on the collectors of transistors 14 and 18, respectively. The alternating current or video signal outputs of transistors 14 and 18 and at attenuator output 110 are superimposed upon the direct current signal levels at associated outputs, respectively.

The waveforms illustrate the net effect at the attenuator output 110 of a constantly decreasing control signal from source 64, which signal may be initially at some positive potential, applied to the attenuator during the time period *t*, after which the direct current control signal remains constant. The current flow in the collectors of the transistors 14 and 18 decreases and the video signal applied to resistors 102 and 106, and appearing at junction 110, is decreased in amplitude. Attenuation of the input video signal is thus effected as the decrease of the control signal causes the base potential of the transistors 14 and 18 to drop and rise respectively, and a greater proportion of current flow through transistors 12 and 16 as illustrated. Upon a decrease of control signal from source 64, the potential at the collector of NPN transistor 14 is positive going and the potential of the collector of the opposite conductivity type PNP transistor 18 is negative going so that the net direct current level change at output 110 is zero.

In order to decrease attenuation and increase the video output signal, the control signal may again be increased to cause greater current flow in transistors 14 and 18. The direct current potential changes at the collectors of transistors 14 and 18 are opposite the changes described and similarly are cancelled in the resistive matrix so that the direct current level at output 110, as shown by the straight line portion of curve C of FIG. 2, remains the same although the control signal may be varied in either an increasing or decreasing sense to effect attenuation of the video signal, the latter sense effecting within the circuit, the attenuation as illustrated in FIG. 2. In normal operation of the circuit, the peak-to-peak output amplitude without attenuation of the video signal may, for example, be approximately one-tenth or greater of the direct current potential at the output 110.

Thus, video signals as attenuated in accordance with the control signal from source 64 and appearing on the collectors of transistors 14 and 18, respectively, are always substantially of the same amplitude and polarity while changes in the direct current level at the collectors of transistors 14 and 18, respectively, are of equal amplitude but of opposite polarity. The direct current level at the output 110 for changes in control voltage remains at substantially the same value as existed before application of the control voltage from the source 64. It should be further noted that the present circuit including the complementary transistor pairs offers a substantial reduction of nonlinear distortion tending to be generated in a single transistor pair. In particular, the average nonlinear distortion generated during some incremental time period within the NPN transistor pair is effective to partially cancel the nonlinear distortion generated during the same incremental time period within the PNP type transistor pair.

Thus, a signal attenuator has been provided in which the signal may be substantially attenuated but yet reproduced as to shape and form without distortion, direct current transients or direct current level changes, and which attenuation may be controlled from a remote source by a small control voltage.

Although only one embodiment of the invention has been shown and described, various modifications as may appear to those skilled in the art are meant to be within the contemplation of the invention as defined in scope by the claims.

What is claimed is:

1. An electrical signal processing circuit, comprising: first and second complementary signal attenuators; input means adapted to receive an input signal; means for coupling a signal received at said input means to said complementary attenuators; variable control means connected with said complementary attenuators to couple a control voltage of substantially the same magnitude to both of said complementary attenuators, the magnitude of said control voltage determining the amount of attenuation imposed upon an input signal coupled to said complementary attenuators; and means for receiving the output signals from said complementary attenuators and combining the same to thus produce an output signal that is free of distortion due to attenuation cause by said processing circuit.

2. The signal processing circuit as defined in claim 1 wherein the first complementary signal attenuator includes: a pair of transistors having input, control, and output electrodes, means connecting the input electrodes of each transistor to the input means and means connecting the control electrodes of said transistors to the variable control means, the output electrode of one of said transistors being connected to the output signal receiving means, and wherein the second complementary attenuator includes: another pair of transistors having input, control, and output electrodes, means connecting the input electrodes of each transistor to the input means, and means connecting the control electrodes of said other pair of transistors to the variable control means, the output electrode of one of said other pair of transistors being connected to the output signal receiving means; the control voltage from the variable control means to regulate the conductivity of each transistor of a pair relative to the other transistor of the associated pair may be varied so as to effect attenuation of the input signal in the output signal receiving means connected to an output electrode of a transistor of each pair of transistors.

3. An electrical signal processing circuit, comprising: a first pair of current flow devices one of which has at least input, control, and output electrodes and the other of which has at least input and output electrodes; a second pair of current flow devices complementary to said first pair with one of said second pair having at least input, control, and output electrodes and the other of which has at least input and output electrodes; input means adapted to receive an input signal; means for coupling an input signal received at said input means to the input electrodes of said pairs of current flow devices; control means connected with the control electrodes of each of said one current flow device of each pair to couple a control voltage thereto, the magnitude of said control voltage determining the amount attenuation imposed upon an input signal coupled to said current flow devices; and matrix means connected between an output electrode of one of said current flow devices of one of said pair of current flow devices and an output electrode of one of said current flow devices of the other of said pair of current flow devices for combining the outputs therefrom to thereby produce an output signal that is free of distortion due to attenution caused by said circuit.

4. The signal processing circuit of claim 3 wherein said first and second pair of current flow devices include a pair of transistors of PNP type and a pair of transistors of NPN type with said pairs being complementary to one another to prevent distortion.

5. A voltage variable signal attenuation circuit comprising: a first signal input; a second signal input for receiving an attenuation control signal; a first network having a pair of current flow control devices with an input, an output, and a control electrode, said current flow control devices having connection means between the input electrodes of each current flow control device; a second network having another pair of current flow control devices with an input, an output, and a control electrode, said current flow control devices having connection means between the input electrodes of each current flow control device; means connecting the first signal input to the input electrode of each of said current flow control devices; means connecting the second signal input to the control electrode of one of said first mentioned pair of current flow control devices and to the control electrode of one of said other pair of current flow control devices; means connected between the output of the one of said first pair of current flow control devices and the output of the other of said second pair of current flow control devices for combining signals appearing at the outputs thereof.

6. The voltage variable signal attenuation network as defined in claim 5 wherein the fist network further includes:

first means connected between the control electrodes of said first pair of current flow control devices of one conductivity type for maintaining the control electrodes of said first pair of current flow control devices at substantially the same alternating current voltage potential;

and wherein the second network further includes:

second means connected between the control electrodes of said second pair of current flow control devices of opposite conductivity type for maintaining the control electrodes of said second pair of current flow control devices at substantially the same alternating current voltage potential.

7. The voltage variable signal attenuation circuit as defined in claim 5 wherein the first pair of current flow control devices is a pair of transistors of one conductivity type, each transistor having an emitter and a base as the input and control electrodes thereof, and a collector as the output thereof, the emitters of said pair of transistors being connected in common and to the first signal input connecting means, the base of one of said transistors being connected to the second input signal connecting means, and the collector of the one transistor being connected to the combining means;

and wherein the second pair of current flow control devices is a pair of transistors of opposite conductivity type, each transistor having an emitter and a base as the input and control electrodes thereof, and a collector as the output thereof, the emitters of said pair of transistors being connected in common and to the first signal input connecting means, the base of one of said transistors being connected to the second input signal connecting means, and the collector of the other of said transistors being connected to the combining means.

8. The voltage variable signal attenuation circuit as defined in claim 7 wherein the first network further includes:

means connected between the bases of said first pair of transistors for maintaining said bases at the same alternating current voltage potential;

and wherein the second network further includes:

means connected between the bases of said second pair of transistors for maintaining said bases at the same alternating current voltage potential;

whereby the impedance of the collector-to-emitter conductivity paths of each transistor of a pair relative to the other transistor of the associated pair is effected substantially only by direct current control signals applied to the bases of said transistors.

9. The voltage variable signal attenuation circuit as defined in claim 8 wherein the first network further includes:

means connected to the collector of said other transistor of said first pair of transistors for bypassing alternating current signals conducted to the collector thereof;

and wherein the second network further includes:

other means connected to the collector of said one transistor of said second pair of transistors for bypassing alternating current signals conducted to the collector thereof;

whereby only signals conducted to the collector of the one transistor of said first pair of transistors and to the collector of the other transistor of said second pair of transistors are combined in the combining means.

10. The voltage variable signal attenuation circuit as defined in claim 9 wherein the combining means includes:

a capacitor connected to the collector of the one transistor of said first pair of transistors;

another capacitor connected to the collector of the other transistor of said second pair of transistors; and resistive means connected between said first mentioned and other capacitors;

whereby the signals on the collector of the one transistor of said first pair of transistors and the other transistor of said second pair of transistors may be combined in the resistive means.

11. A signal attenuator comprising:

input for applying a signal;

a first pair of current flow control devices of one conductivity type, each device having first and second inputs and an output, said first inputs being connected each to the other and to the input means;

a second pair of current flow control devices of another conductivity type, each device having first and second inputs and an output, said first input being connected each to the other and to the input means;

means for applying a control signal to one of the second inputs of said first paid of current flow control devices and to one of the second inputs of said second pair of current flow control devices;

means connected to said second inputs of said first pair of current flow control devices to maintain said second inputs at substantially the same alternating current voltage potential;

means connected to said second inputs of said second pair of current flow control devices to maintain said second inputs at substantially the same alternating current voltage potential;

means for biasing the first pair of current flow control devices in one sense and the second pair of current flow control devices in another sense;

means for by-passing alternating current signals from the output of one of said first pair of current flow control devices;

means for by-passing alternating current signals from the output of one of said second pair of current flow control devices;

means connected between the output of the other of said first pair of current flow control devices and the output of the other of said second pair of current flow control devices for combining the signals appearing at said outputs.

12. The signal attenuator as defined in claim 11 wherein the first pair of current flow control devices includes:

a pair of transistors of one conductivity type, each having an emitter as the first input, a base as the second input and a collector as the output, respectively;

the emitters of said transistors being connected together, and the base of one of said transistors being connected to the control signal applying means and to the base of the other transistor through the first mentioned means for maintaining the alternating current voltage potential of the second inputs substantially equal, the collector of the one transistor being connected to the combining means and the collector of the other transistor being connected to the first mentioned alternating current by-passing means; and wherein the second pair of current flow control devices includes:

a pair of transistors of another conductivity type, each having an emitter as the first input, a base as the second input and a collector as the output, respectively, the emitters of said transistors being connected together, and the base of one of said transistors being connected to the control signal applying means and to the base of the other transistor of said second pair of transistors through the means for maintaining the alternating current voltage potential of the second inputs of the second pair of current flow control devices substantially equal, the collector of the one transistor being connected to the alternating current by-passing means of the second pair of transistors, and the collector of the other transistor being connected to the combining means.

13. The signal attenuator as defined by claim 11 wherein the first pair of current flow control devices includes:

a pair of transistors, each having emitters as the first input and connected together, bases as the second inputs, and collectors as the outputs, respectively; and the second pair of current flow control devices includes:

a pair of transistors, each having emitters as the first inputs and connected together, bases as the second inputs, and collectors as the output, respectively;

the emitter to collector conductivity paths of each transistor of each pair being of low impedance in the absence of a signal from the control signal applying means; and wherein the input means for applying a signal includes a high impedance network;

whereby a signal to the emitters of said transistors is substantially conducted to associated collectors of said transistors in universal form.

14. The signal attenuator as defined by claim 11 wherein the combining means includes:

a first capacitor connected to the output of the other of said first pair of current flow control devices; and a second capacitor connected to the output of the other of said second pair of current flow control devices;

resistance means serially connected between said first and second capacitors;

whereby signal from the outputs of the other of said first and second pairs of current flow control devices may be combined in amplitude and polarity at said resistance means.

15. A video signal attenuator comprising:

input means for receiving a video signal;

a first network having a pair of transistors of one conductivity type, each transistor having low impedance collector-to-emitter conductivity path; the emitters being connected to the input means;

another network having a pair of transistors of opposite conductivity type, each transistor having low impedance collector-to-emitter paths, the emitters being connected to the input means;

means connected with said networks for applying a control signal to vary conduction of the transistors in one sense and another sense, conduction of one of the transistors of said first pair being in the one sense and the other sense upon conduction of one of the transistors of said second pair being in the one sense and the other sense, respectively;

and conduction of the other transistor of said first pair being in the one sense and the other sense upon conduction of said other transistor of said second pair being in the one sense and other sense, respectively; and means for combining the signals from the collector of a transistor of said first pair and from the collector of a transistor of said second pair conductive in the same sense as the transistor of said first pair.

16. The video signal attenuator as defined in claim 15 wherein the control signal applying means includes:

a control signal input, a voltage divider network between the control signal input and the base of a single transistor of each pair of transistors, said voltage dividing network being connected to a transistor of said first pair of transistors conductive in the one sense and the other sense upon conduction of the transistor of said second pair connected to the voltage dividing network in the other sense and one sense, respectively.

17. The video signal attenuator as defined in claim 16 whereing the combining means includes:

a capacitor connected to the collector of a transistor of said first pair of transistors;

another capacitor connected to the collector of a transistor of said second pair of transistors, the transistor of said first pair and second pair being conductive in the same sense in response to control signals from the control signal applying means; and resistance means serially connected between said capacitors:

whereby signals on the collector of the transistors of each pair connected to the first mentioned and other capacitors, respectively, may be combined.

References Cited

UNITED STATES PATENTS

| | | | |
|---|---|---|---|
| 3,231,827 | 1/1966 | Legler | 330—30X |
| 3,323,078 | 5/1967 | Falk | 330—296X |

JOHN KOMINSKI, Primary Examiner

J. B. MULLINS, Assistant Examiner

U.S. Cl. X.R.

330—29, 30